July 19, 1960   H. W. ASCHINGER   2,945,383
HERMETICALLY-SEALED COUPLING ASSEMBLY
Filed Aug. 11, 1959   2 Sheets-Sheet 1

INVENTOR.
Harold W. Aschinger

July 19, 1960   H. W. ASCHINGER   2,945,383
HERMETICALLY-SEALED COUPLING ASSEMBLY
Filed Aug. 11, 1959                              2 Sheets-Sheet 2

INVENTOR.
Harold W. Aschinger
BY
Karl Haber Attorney
John G. Kovalick Agent

United States Patent Office 2,945,383
Patented July 19, 1960

2,945,383

HERMETICALLY-SEALED COUPLING ASSEMBLY

Harold W. Aschinger, 422 Oak St., Ridgefield, N.J.

Filed Aug. 11, 1959, Ser. No. 833,028

8 Claims. (Cl. 74—18.1)

The present invention deals with a hermetically-sealed coupling assembly and more particularly with a hermetically sealed coupling assembly for connecting a pair of axially spaced rotary shafts having a motion transmission means therebetween.

It is an object of the present invention to provide a hermetically-sealed coupling for a pair of axially-spaced rotary shafts operating between different mediums, e.g. between a gas chamber and ambient liquid.

It is another object of the invention to provide a hermetically-sealed coupling mounted through a wall between mediums of different fluid pressures.

It is a further object of the invention to provide a hermetically-sealed coupling comprising an economical and simple motion transmission means between a pair of axially-spaced rotary shafts, and including resilient hermetical seal means between the shafts.

Figure 1:
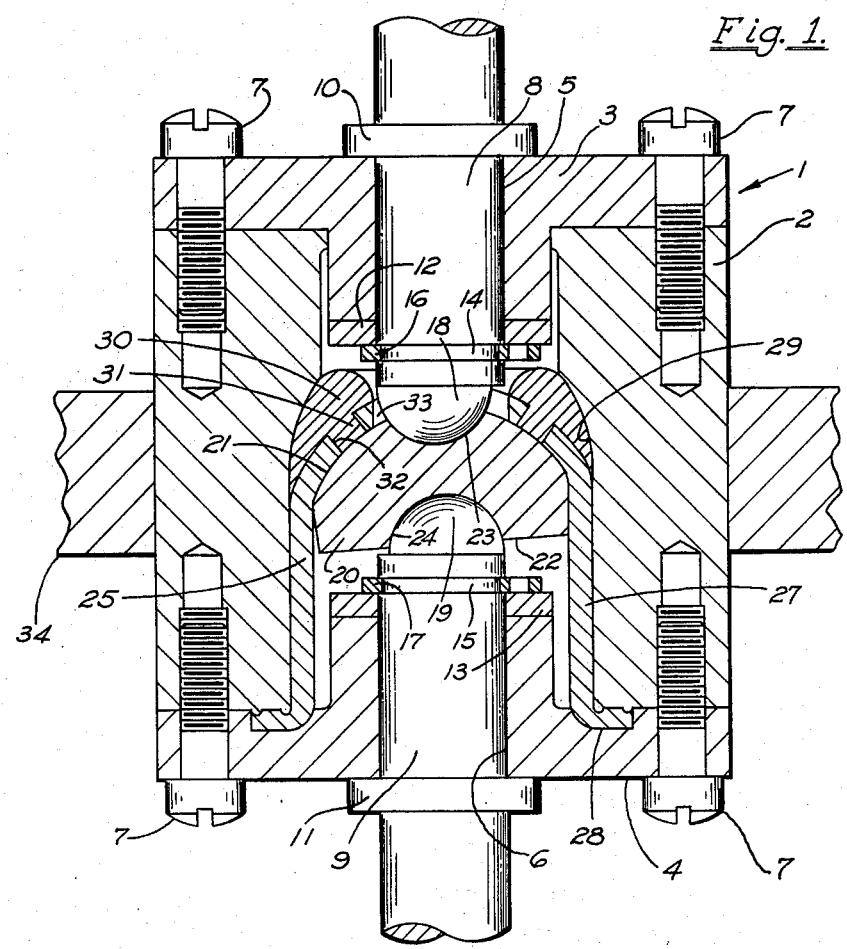
Figure 3:
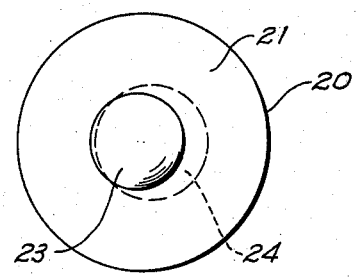
Figure 4:
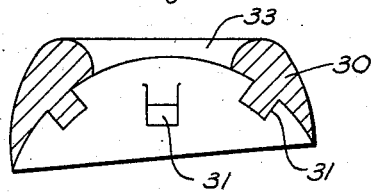
Figure 2:
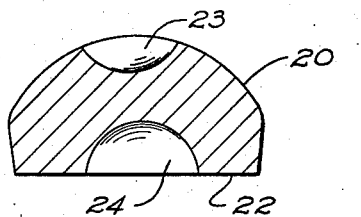
Figure 5:
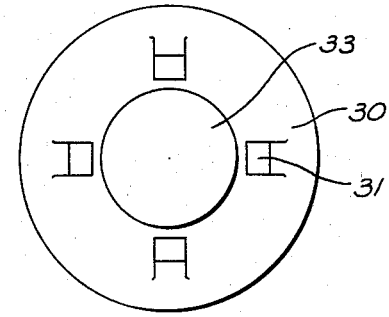
Figure 6:
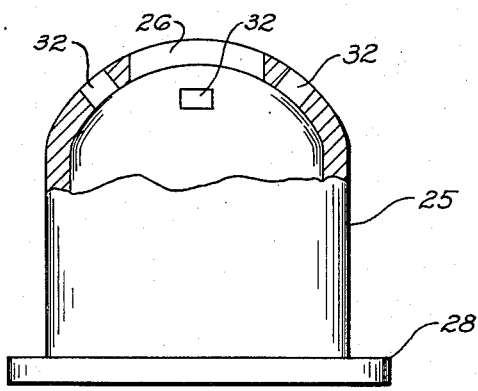

Other objects and advantages of the invention will become apparent from the description hereinafter following and the drawings forming a part hereof in which:

Figure 1 illustrates a partly elevational and partly cross-sectional view of a hermetically-sealed coupling assembly according to the invention, Figure 2 illustrates a cross-sectional view of one embodiment of the invention, Figure 3 illustrates a top view of Figure 2, Figure 4 illustrates a cross-sectional view of another embodiment of the invention, Figure 5 illustrates a bottom view of Figure 4, and Figure 6 illustrates a partly elevational view and a partly cross-sectional view of still another embodiment of the invention.

The invention deals with a hermetically-sealed coupling assembly for connecting a pair of axially-spaced rotary shafts with a motion transmission means therebetween, wherein one shaft is connectable to driving means and the other shaft to a driven means, and the motion transmission means is a simple and effective means for transmitting rotary motion from one shaft to the other by intermediate oscillatory motion.

Regarding the illustrations, the invention comprises a housing 1 composed of an open-ended casing 2 with the open ends thereof provided with closure caps 3 and 4. Each cap is provided with journal bores 5 and 6, respectively. The caps are mounted on the ends of the casing 2 by securing means, e.g. bolts 7, and a pair of coaxial shafts 8 and 9 are each journalled through one of the bores 5 and 6, respectively. A coaxial thrust collar 10 and 11 is positioned on each shaft and rotatably abuts the outer surface of a cap 3 and 4. The shafts 8 and 9 are coaxial and extend through the caps into the casing 2 and are axially spaced from each other within the casing. End portions of the shafts extending into the casing are provided with washers 12 and 13 abutting the inner surface of the caps 3 and 4, and the end portions are further provided with annular grooves 14 and 15 forwardly of the washers 12 and 13 and snap rings 16 and 17 are mounted in the grooves for coaction with collars 10 and 11 for retaining the shafts against axial displacement. The ends of the shafts 8 and 9 are terminal heads 18 and 19 having spherical surfaces. However, each spherical surfaced head is essentially eccentric to its shaft axis.

A rotary motion transmission means 20, hereinafter referred to as a "wobble plate" is positioned between the heads 18 and 19 and in direct frictional contact therewith. The wobble plate 20 comprises a convex surface 21 and an opposite flat surface 22 with a spherical recess 23 in the arcuate surface and a spherical recess 24 in the opposite flat surface. The recesses 23 and 24 are so positioned that their axes are preferably laterally spaced one from the other so that the eccentric heads 18 and 19 are at all times in full frictional mating contact with the recesses. As illustrated, one of the recesses is deeper than the other, although both may have equal depths and may be of the same or different diameters.

When the heads 18 and 19 are in frictional contact with the recesses 23 and 24, any rotation of the shaft 8 causes the wobble plate 20 to oscillate from about 1° to about 5° transversally of the driven shaft axis which motivates the eccentric head 19 of the shaft 9 to follow the oscillation of the wobble plate and which by virtue of the eccentric head 19 causes the shaft 9 to rotate in the direction of shaft 8.

In order to hermetically seal one shaft from the other and to fix the wobble plate 20 against rotation, but to permit oscillating motion thereof within certain limits, the wobble plate 20 is mounted within an elastic cup-like diaphragm 25, e.g. rubber, as illustrated by Figure 6, wherein the arcuate surface 21 of the wobble plate is vulcanized or otherwise hermetically bonded to the correspondingly shaped inner surface of the cup-like diaphragm, the cup-like diaphragm being provided with an aperture 26 permitting the head 18 to contact the recess 23. The wall 27 of the cup-like diaphragm 25 abuts the inner wall of the casing 2 and comprises terminal flanges 28 hermetically clamped between the cap 4 and the corresponding end of the casing 2.

In order to relieve elastic stresses from rupturing the hermetic bond between the diaphragm and the wobble plate 20, the casing is provided with an inner annular bearing seat 29 in which is seated a bearing ring 30 as shown by Figures 4 and 5. The bearing ring 30 is provided with lugs 31 passing through corresponding apertures 32 of diaphragm 25 and contacting the convex surface 21 of wobble plate 20, the bearing ring having a central aperture 33 and being positioned between the shaft 8 and diaphragm 20, with the head 18 passing through the aperture 33 to contact the recess 23.

In operation the oscillatory wobble plate moves over the contacting bearing surfaces of the lugs 31, the diaphragm being confined to the wobble plate by means of the ring 30, whereby the elastic material of the diaphragm is caused to stretch and contract according to the oscillating movement of the diaphragm 20, and whereby the oscillation of the wobble plate is caused to motivate the eccentric head 19 of shaft 9 for rotary motion thereof.

The casing 2 is mounted into a wall aperture of wall 34, e.g. by welding therein to provide a hermetical seal.

It is apparent from the above description that the hermetically-sealed coupling assembly operates to transform rotary motion to oscillating motion to rotary motion by means of a simple motion transmission means comprising an oscillating member, e.g. a particular wobble plate mounted within a cup-shaped elastic diaphragm.

Various modifications are contemplated within the scope of the appended claims.

What is claimed is:

1. A hermetically sealed coupling assembly comprising a casing, a pair of coaxial shafts journalled in the casing and spaced from each other within the casing, the ends of the spaced shafts within the casing each having an eccentric spherical-surfaced head, a motion transmission body between the heads and in contact therewith, spherical depressions in said motion transmission body in frictional contact with the eccentric heads, a cup-shaped elastic diaphragm secured internally of the casing, the motion-transmitting body being positioned internally of the cup-shaped elastic diaphragm, one of the shafts contacting one of said depressions through an aperture through said diaphragm.

2. A hermetically sealed coupling assembly comprising a casing, a pair of coaxial shafts journalled in the casing and spaced from each other within the casing, the ends of the spaced shafts within the casing each having an eccentric spherical-surfaced head, a motion transmission body between the heads and in contact therewith, spherical depressions in said motion transmission body in frictional contact with the eccentric heads, a cup-shaped elastic diaphragm secured internally of the casing, the motion-transmitting body being positioned internally of the cup-shaped elastic diaphragm, one of the shafts contacting one of said depressions through an aperture through said diaphragm, an annular recessed bearing seat in the internal surface of the casing, a bearing ring in the bearing seat, said bearing ring contacting the diaphragm.

3. A hermetically-sealed coupling assembly according to claim 1, comprising means for securing said shafts against axial displacement.

4. A hermetically-sealed coupling assembly according to claim 1, wherein the axes of the spherical depressions are spaced internally of each other.

5. A hermetically-sealed coupling according to claim 2, wherein said ring comprises lugs projecting from its internal surface, apertures in the cup-shaped diaphragm, said lugs passing through said apertures and contacting said motion transmission means.

6. A hermetically-sealed coupling assembly comprising a casing, a pair of coaxial shafts journalled in the casing and spaced from each other within the casing, the ends of the spaced shafts within the casing each having an eccentric spherical-surfaced head, a motion transmission body between the heads and in contact therewith, spherical depressions in said motion transmission body in frictional contact with the eccentric heads, a cup-shaped elastic diaphragm secured internally of the casing, the motion-transmitting body being positioned internally of the cup-shaped elastic diaphragm, one of the shafts contacting one of said depressions through an aperture through said diaphragm, said motion-transmission means being hermetically bonded to said elastic diaphragm.

7. A hermetically-sealed coupling assembly comprising a casing, a pair of coaxial shafts journalled in the casing and spaced from each other within the casing, the ends of the spaced shafts within the casing each having an eccentric spherical-surfaced head, a motion transmission body between the heads and in contact therewith, spherical depressions in said motion transmission body in frictional contact with the eccentric heads, a cup-shaped elastic diaphragm secured internally of the casing, the motion-transmitting body being positioned internally of the cup-shaped elastic diaphragm, one of the shafts contacting one of said depressions through an aperture through said diaphragm, said motion-transmission means being hermetically bonded to said elastic diaphragm, said elastic diaphragm being hermetically bonded to an end of said casing.

8. A hermetically-sealed coupling assembly comprising a casing, a pair of coaxial shafts journalled in the casing and spaced from each other within the casing, the ends of the spaced shafts within the casing each having an eccentric spherical-surfaced head, a motion transmission body between the heads and in contact therewith, spherical depressions in said motion transmission body in frictional contact with the eccentric heads, a cup-shaped elastic diaphragm secured internally of the casing, the motion-transmitting body being positioned internally of the cup-shaped elastic diaphragm, one of the shafts contacting one of said depressions through an aperture through said diaphragm, a housing, an aperture through the wall of said housing, said casing being hermetically sealed in said housing aperture.

References Cited in the file of this patent

UNITED STATES PATENTS 1,378,118     Jacobsen et al.     May 17, 1921